(12) United States Patent
Pawlik et al.

(10) Patent No.: US 8,893,974 B2
(45) Date of Patent: Nov. 25, 2014

(54) DECODER FOR BARCODES WITH ANTI-COPY FEATURE

(71) Applicants: Thomas D. Pawlik, Rochester, NY (US); Myra T. Olm, Webster, NY (US)

(72) Inventors: Thomas D. Pawlik, Rochester, NY (US); Myra T. Olm, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 119 days.

(21) Appl. No.: 13/690,161

(22) Filed: Nov. 30, 2012

(65) Prior Publication Data

US 2014/0151454 A1  Jun. 5, 2014

(51) Int. Cl.
  *G06K 7/10* (2006.01)
  *G06K 7/00* (2006.01)
  *G06K 19/06* (2006.01)

(52) U.S. Cl.
  CPC .......................................... *G06K 7/10* (2013.01)
  USPC ............ 235/462.01; 235/462.41; 235/462.04; 235/494

(58) Field of Classification Search
  USPC ...................... 235/375, 462.01, 494
  See application file for complete search history.

(56) References Cited

U.S. PATENT DOCUMENTS

| 5,850,080 | A  | * | 12/1998 | Herzig ........................ 235/494 |
| 6,354,501 | B1 | * | 3/2002  | Outwater et al. ........ 235/462.01 |
| 7,227,661 | B2 | * | 6/2007  | Matsunoshita ............. 358/1.15 |
| 2003/0179412 | A1 | * | 9/2003 | Matsunoshita ............. 358/3.28 |
| 2005/0041263 | A1 | * | 2/2005 | Ishikawa et al. ............ 358/1.14 |
| 2005/0225080 | A1 | * | 10/2005 | Wicker ........................ 283/117 |
| 2006/0081718 | A1 | * | 4/2006 | Havard ........................ 235/494 |
| 2009/0289115 | A1 | * | 11/2009 | Chung et al. ................. 235/386 |
| 2011/0121066 | A1 | * | 5/2011 | Tian et al. .................... 235/375 |
| 2013/0320099 | A1 | * | 12/2013 | Acton et al. ................. 235/494 |

\* cited by examiner

*Primary Examiner* — Tuyen K Vo
(74) *Attorney, Agent, or Firm* — Nelson Adrian Blish

(57) ABSTRACT

A method for detecting reproduction of barcodes (12) includes providing a barcode which contains data; providing a copy-evident background (14); capturing an image of the barcode and the copy-evident background; locating and decoding the barcode; detecting copy introduced changes in the copy-evident background; and authenticating the barcode if the copy-evident background has not been copied.

8 Claims, 6 Drawing Sheets

DECODER FOR BARCODES WITH ANTI-COPY FEATURE

CROSS REFERENCE TO RELATED APPLICATIONS

Reference is made to commonly-assigned copending U.S. patent application Ser. No. 13/690,180 (now U.S. Publication No. 20140151445), filed Nov. 30, 2012 herewith, entitled SYSTEM FOR DETECTING REPRODUCTION OF BARCODES, by Pawlik et al.; the disclosure of which is incorporated herein.

FIELD OF THE INVENTION

This invention relates in general to authentication of objects and more particularly relates to prevention of authentication of objects which have been copied.

BACKGROUND OF THE INVENTION

A problem which has been encountered in the industry is returning objects to obtain refunds. Even if the legitimate objects have barcodes or other means for authenticating the object, counterfeiters often make photocopies of legitimate labels in order to obtain refunds or to return objects.

SUMMARY OF THE INVENTION

Briefly, according to one aspect of the present invention a barcode containing data is printed on or near a copy-evident background. The barcode is read to extract the data by capturing an image of the barcode with an imaging device such as a mobile phone camera. The barcode is located and decoded using the registration locators in the barcode image to locate and detect copy-evident features of specific regions of the copy-evident background. Upon successful detection of the copy-evident features, the barcode is authenticated as an original barcode. In a specific embodiment of this invention, the barcode itself is printed with a fill comprised of a copy-evident color or pattern.

The invention and its objects and advantages will become more apparent in the detailed description of the preferred embodiment presented below.

DETAILED DESCRIPTION OF THE INVENTION

Figure 1:
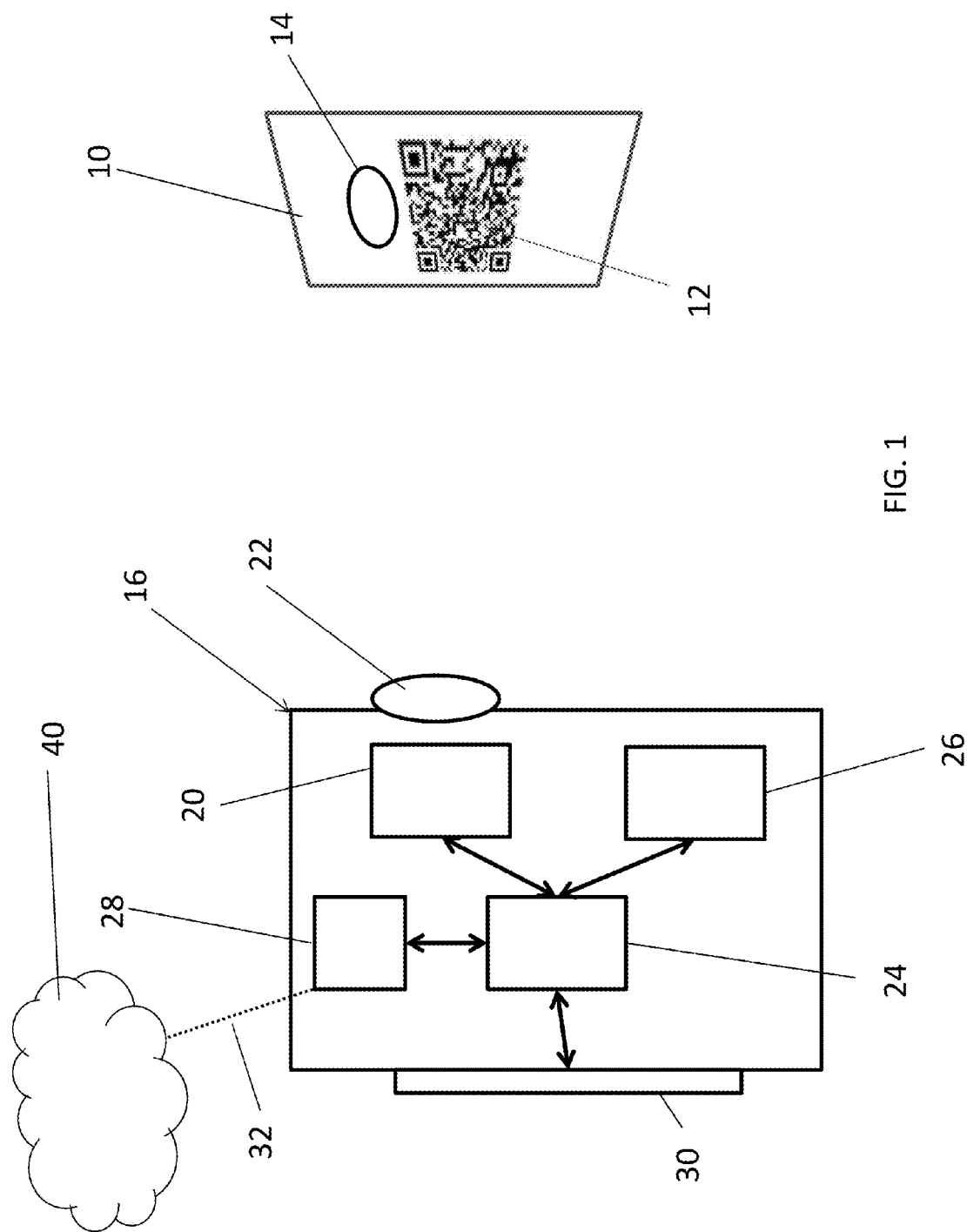
FIG. 1 shows a schematic of a device used to scan an image containing a barcode.

The present invention will be directed in particular to elements forming part of, or in cooperation more directly with the apparatus in accordance with the present invention. It is to be understood that elements not specifically shown or described may take various forms well known to those skilled in the art.

Barcodes on packaging and publications are widely used by manufacturers and publishers to associate identity data with an item. The term barcode covers a variety of code types including quick response codes (QR codes).

Barcode scanners can be used to decode and read this data in the supply chain and marketplace. In many cases, item barcodes are unique for each item and, when used with a track and trace database, provide the manufacturer, publisher, or authorities a means of tracing the origin of a product and tracking its progress through the distribution system. Item level serialization allows manufacturers and publishers to use barcodes, particularly barcodes to support product recalls, and to combat counterfeiting and diversion by checking on the authenticity and e-pedigree of the product, publication or document. When used in this manner, it is particularly important to verify that the barcode being read is an authentic barcode on an authentic item, and that it has not been copied and reprinted on a counterfeit item, or on an authentic item that has been diverted outside of the authorized supply chain.

Today, most mobile phones are equipped with cameras and mobile applications which allow the user to easily scan barcodes anytime and anywhere, with a device they carry with them in their pocket. Manufacturers and publishers use barcodes, for example the "Quick Response" or QR barcode to provide consumers, retailers, and investigators a convenient method to obtain information with additional product data and to easily link to product-related websites. Mobile phones equipped with cameras can also be used to decode data or web site links which can be used to verify the authenticity and e-pedigree of the product, publication or document.

As economic and safety-related threats from counterfeit and diverted product become more prevalent, there is an increasing need for a product authentication methods anyone can use. One such approach uses mobile phones equipped with cameras and software to decode barcodes and to verify the authenticity and e-pedigree of the item containing the barcode based on the decoded data (including data on associated websites). In order for this approach to be effective, it is necessary to ensure that the barcode being read is an authentic barcode on an authentic item, and that it has not been copied and reprinted on a counterfeit item, or on an authentic item that has been diverted outside of the authorized supply chain.

The present invention provides a method of ensuring that a printed barcode, when imaged by an imaging device such as a mobile phone camera and subsequently decoded, is the original barcode and not a copy. In this invention, a barcode containing data is printed on or near a copy-evident background, the barcode is read to extract the data by capturing an image of the barcode with an imaging device such as a mobile phone camera, locating and decoding the barcode, using the registration locators in the barcode image to locate and detect copy-evident features of specific regions of the copy-evident background, and, upon successful detection of the copy-evident features, authenticating the barcode as an original barcode and not a copy. In a specific embodiment of this invention, the barcode itself is printed with a fill comprised of a copy-evident color or pattern.

The copy-evident background or fill could be made up of a void pantographs pattern. Void pantographs are commonly used as backgrounds on financial documents such as checks. The void pantograph patterns are designed to exploit the limitations in resolution of copiers and scanners. In one common void pantograph pattern called big-dot-little-dot, the small dots are below the resolution threshold of the copier and become lighter when copied. This increases the contract between the small dots and the large dots and the "void" message in the original document becomes obvious in the copy. A variety of other void pantograph approaches exist and are continually being improved as copier and scanner technology advances are made.

Color can also be used as a copy-evident feature. In the simplest embodiment of this approach, any color that is present in the background or barcode, is copy-evident, if it is copied with a black and white copier. More complicated approaches to using color as a copy-evident tool include the use of special inks that change color with special stimuli, such as thermochromic ink (heat), or uv-fluorescent inks (UV light). These stimuli affect the color of the copy-evident feature and must be applied when an image of the copy-evident feature is captured. This is difficult if the image is captured with a scanner or copier, but can be done if the image is captured with a mobile phone camera.

Referring now to FIG. 1 which shows a schematic of a device used to scan an item 10 that contains a barcode 12 and copy-evident features 14. An image of this item is captured by an image sensor 20 and imaging optics 22 of a digital camera 16. The image data is processed by a microprocessor 24 using an algorithm stored in memory 26. The processing step can include decoding of the barcode 12 and evaluation of the copy-evident features 14. The microprocessor also controls a display 30 where a preview image and information about the decoded data can be displayed. The camera also contains a wireless interface 28 that allows the microprocessor to communicate with a web-based data-processing server 40 via a wireless data link 32.

Figure 2:
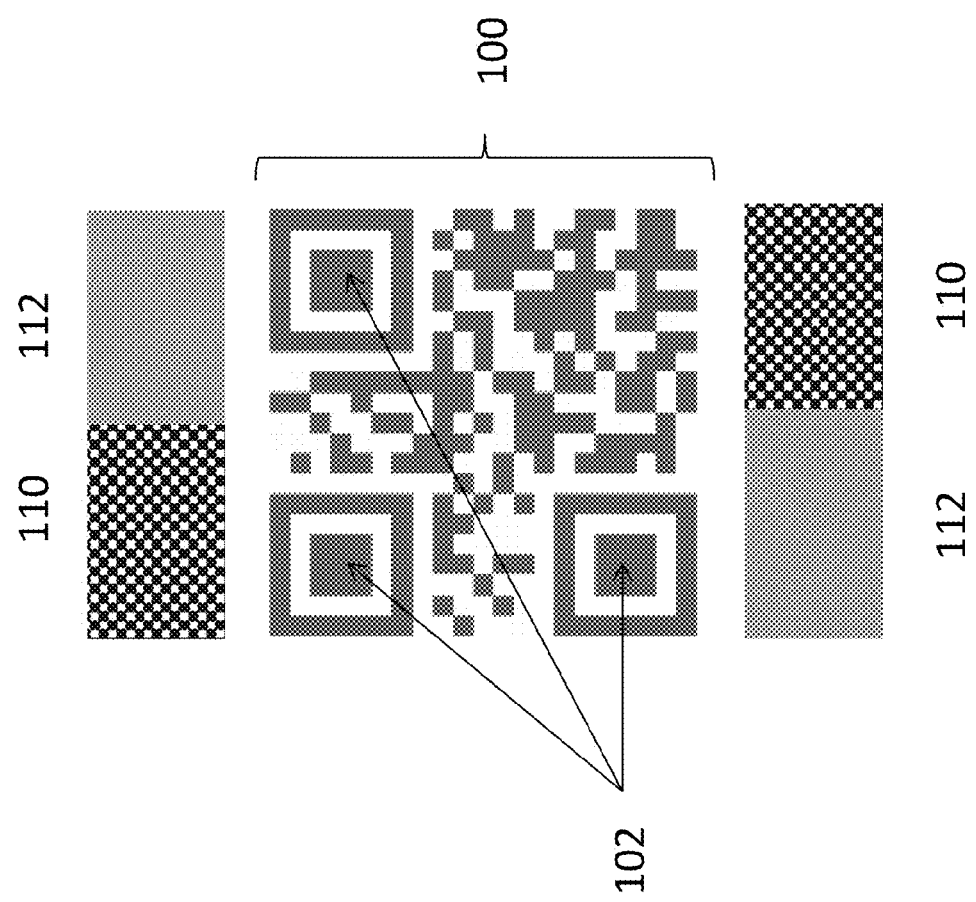
FIG. 2 shows an example of a barcode printed with a copy-evident feature.

FIG. 2 shows an example of a barcode printed near copy-evident features. The barcode 100 is of the type "Quick Response" (QR) and is surrounded by a copy-evident background 14 consisting of four patches exhibiting two distinct image patterns. Areas 110 are coarse dot patterns, areas 112 exhibit a uniform grey value. The average brightness of the two patterns is approximately equal. The camera 16, shown in FIG. 1, determines the average brightness of the patches by capturing an image and using the microprocessor 24 to calculate the average pixel value in an area that encompasses a substantial fraction of each patch. Of particular importance for this invention is the difference in average brightness of the two distinct patterns.

It is be beneficial to locate the patches at a predetermined distance with respect to the finder patterns 102 of the barcode shown in FIG. 2. The locations of the finder patterns, which are provided by a barcode decoding algorithm, are used as a guide to locate the four patches. Finder patterns are a feature of all barcode types and allow the decoding algorithm to find the barcode in an image and to determine its dimensions patterns are the features labeled 102. In a Datamatrix barcode, the finder pattern is a rectangle formed by two orthogonal solid lines and two alternating light and dark lines opposite the solid lines.

Figure 3:
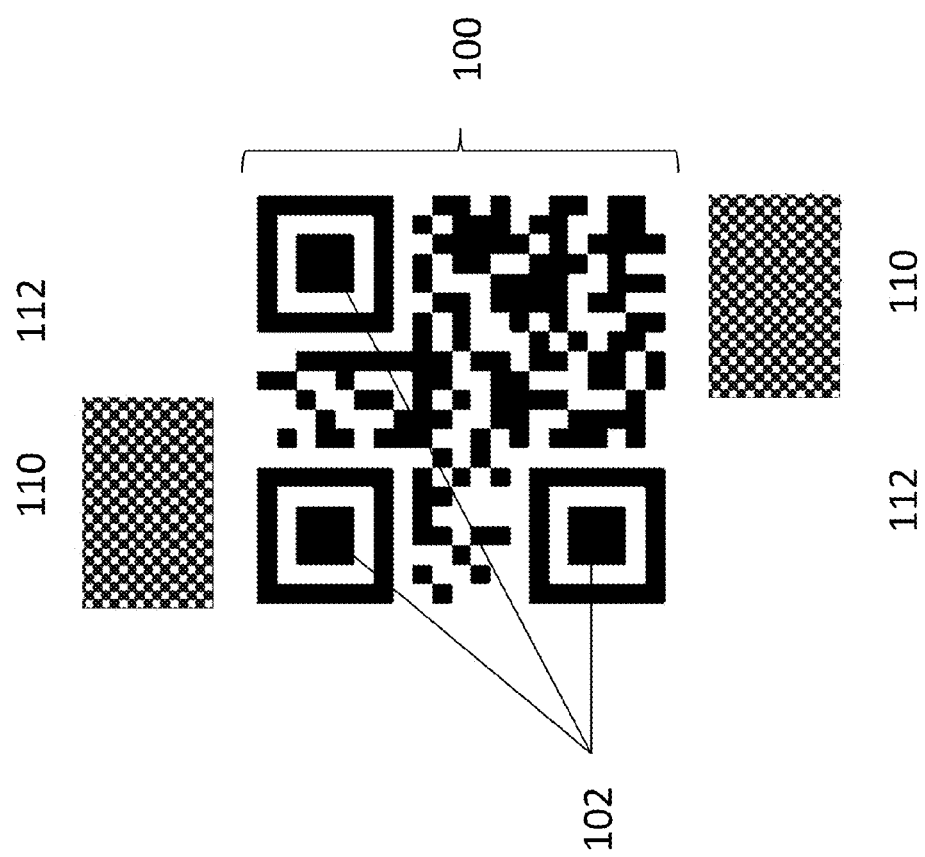
FIG. 3 shows the barcode of FIG. 2 after copying on a black and white photocopier.

FIG. 3 shows the barcode incorporating anti-copy features after copying on a black and white copier. Such devices are often engineered to maximize image contrast of the copy by using a thresholding technique that that creates a binary (black and white) image. This image manipulation reproduces halftone images well, but does not accurately reproduce true grayscale images. As can be seen by comparing FIGS. 2 and 3, the copy process affects the two patterns 110 and 112 differently. While the large dot patterns 110 are reproduced accurately, the uniform grey areas 112 are below the threshold and reproduced as white. Therefore, an evaluation of the average brightness of the two patterns of the copy will yield a large difference in brightness. Consequently, the evaluation of the brightness difference can be used to distinguish the original from the copy by comparing it to expected brightness ranges. Although brightness is used in this example, other image attributes such as image noise and color may be used as long as they can be calculated from the pixel data of a digital image of the copy-evident features and as long as they are substantially different for the original and the copy.

FIG. 2 may be printed in multiple colors and the copy distinguished from the original by verifying the presence of the original color values at specified distances from the finder patterns within the barcode.

Figure 4:
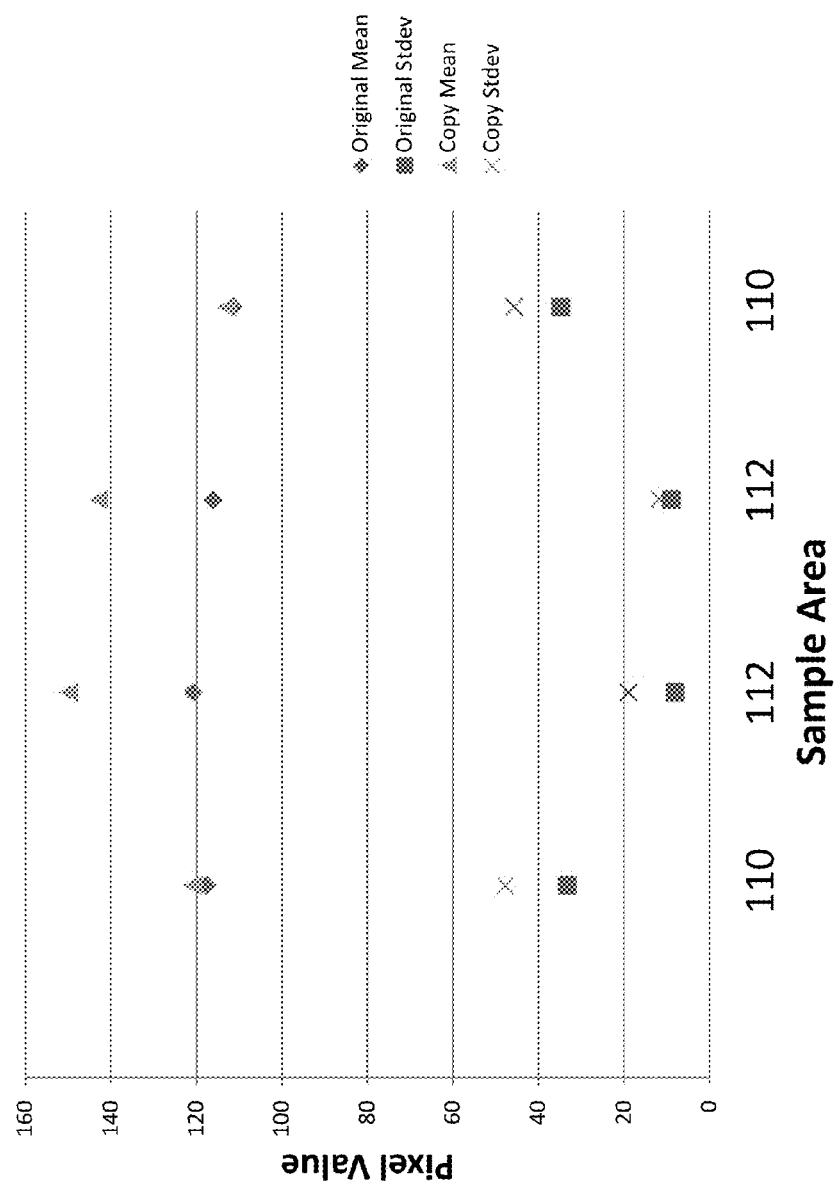
FIG. 4 shows a graph comparing original and photocopied barcodes.

FIG. 4 shows data produced by evaluating the average pixel value of areas 110 and 112 using digital images of the original and the copied barcode incorporating anti-copy features. In this example, the mean pixel value of the two areas 110 as shown in FIGS. 2 and 3 is approximately equal for the original and the copy whereas it is different for the two areas 112. One can define a parameter DIFF=mean pixel value of areas 112–mean pixel value of areas 110. This parameter is 3.8 for the original and 29.6 for the copy. Therefore, a threshold can be defined that separates the original and copy. For any subsequent image of the barcode incorporating anti-copy features the parameter can be calculated and, if it is above the threshold, the barcode is rejected.

An additional embodiment for separating the copied barcode from the original is to analyze the color of the barcode itself or of patches at specified distances from the finder patterns within the barcode. For example, if the barcode it is printed using a non-black ink, a black and white copy will not reproduce the color accurately. For color copies, the barcode can be printed with certain inks that are not well reproduced by the yellow, magenta, and cyan color components of a color copier. One examples of such inks is neon pink.

Furthermore, one could print the barcode using an ink that changes color when subjected to illumination with a specialized light source like ultraviolet light. In a simple example, the barcode 12 is printed using red ink and the location of the finder pattern is used to determine the RGB color coordinates of the pixels in the center of the finder pattern. In this example, the RGB values of the digital image obtained from the original are RGB (117, 29, 60) whereas the copy has RGB values of (38, 40, 46). In order to identify a barcode as original we would look for a substantially larger R value in the RGB color coordinate which is clearly evident in the relevant data of the image of the original whereas the RGB values of the analogous data of the image of the copy are similar, indicating a grey pixel color.

Figure 5:
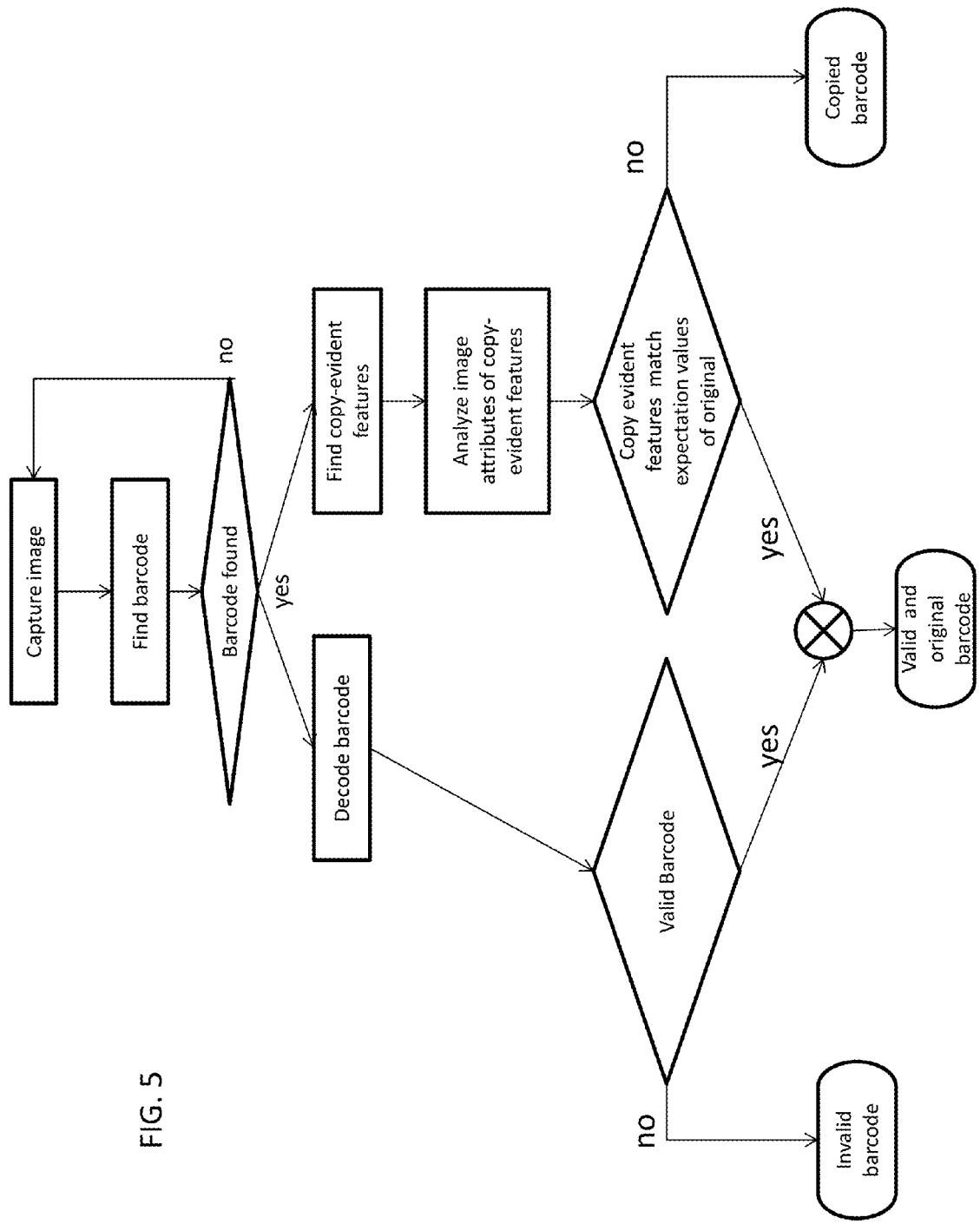
FIG. 5 shows a flowchart illustrating the coding and authentication process.

FIG. 5 shows a flow chart that illustrates the process for decoding and authenticating a barcode using the anti-copy feature in this invention.

The preceding example offered means to distinguish original barcodes from barcodes copied by direct reproduction. A second method of creating a counterfeit barcode that holds identical data to the original barcode is to scan the code and recreate a new barcode that encodes the same data. This recreation can, for example, be achieved by scanning the code using a smart phone or barcode reader, opening a barcode creation software on a PC, copying the code information from the smart phone to the PC and creating a barcode with the same information.

While this copy process will create a code that holds the same information as the original code, there are ways to distinguish the original from the recreated barcode that revolve around restricting the acceptable formatting of the barcode. In the case of a QR code there are three parameter that are used in the code generation process. They are Error Correction Level (S, M, Q, H), Code Size (Also called Version, Dimension) of the code, and Code Mask (1-8). The Error Correction Level determines the percentage of the code space that is used for error correction. The Code Size limits the total amount of data that can be encoded. The Code Mask is a regular binary pattern of 1 and 0 of the same dimension as the code matrix. It is convoluted with the code pattern excluding the finder patterns and code format bits such that the code cells are reversed (e.g. black replaced by white) when the code mask at this location is 1, and cells are not reversed when the code mask at this code location is 1.

Selection of the proper mask serves to maximize decodability. Of these three parameters, the first two can usually be selected manually, but the third is set automatically with all current QR code generating PC or web-based software. If one, therefore, uses a QR code generating algorithm that predetermines the mask parameter and combines it with a proprietary QR code decoder that only decodes those QR codes that match the predetermined mask parameter, the chance for a counterfeiter to generate a valid QR code is reduced by a factor of eight. Other parameters that could be used to attain a non-default method of encoding are non-standard methods of error correction (e.g. ECC080 instead of the default ECC200).

Figure 7:
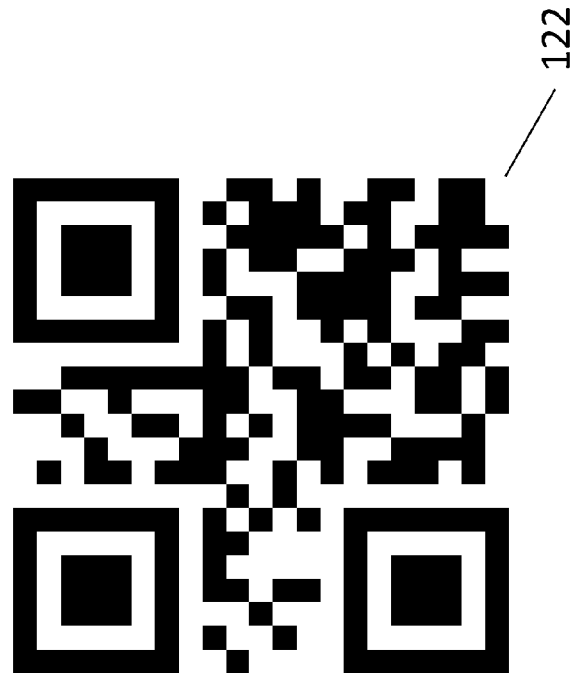
FIG. 7 shows encoding as separate strings.
Figure 6:
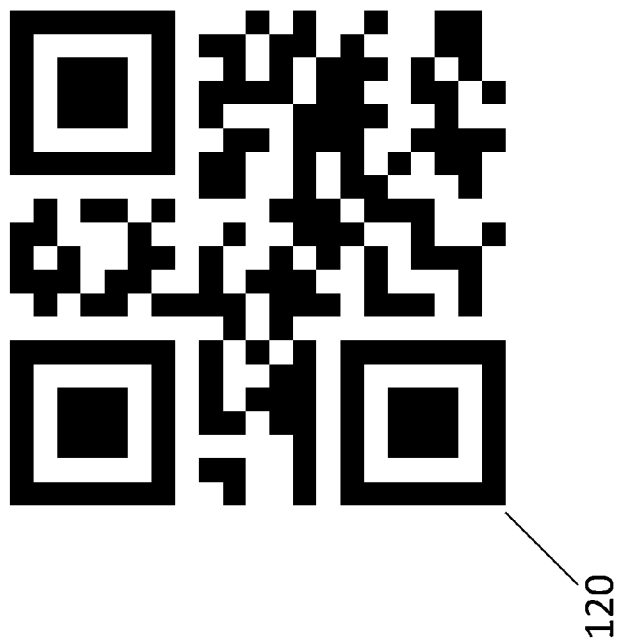
FIG. 6 shows normal encoding.

In addition to this countermeasure, one can exploit the feature of QR codes that allows concatenation of messages of varying length. For example, the number "16529426" would normally be encoded as a single string of numerals 120 of the length 8. However, it is also possible to encode this number as separate strings of numerals 122 of varying length for example "1" followed by "6" followed by "529426." As shown in FIGS. 6 and 7, these two methods of encoding lead to completely different QR code patterns and although the QR code decoding algorithm will ultimately deliver the same result, the raw data of the decoded QR code is different. One can therefore, program a proprietary QR code decoding algorithm such that it will only accept QR codes when the raw data shows that the code is broken into sub-strings of numerals of a predetermined length that matches a set of predetermined expectations. A normal QR code encoder that a counterfeiter would use to recreate a scanned QR code will encode the message as a single string of numerals 120. Therefore the proprietary QR code decoder will be able to distinguish the recreated QR code from the original QR code even if the other parameters (Error Correction Level, Code Size and Code Mask) are the same in the original and recreated code.

Within a single error correction methodology, the above methods of encoding the QR code in a non-standard way do not affect the degree of error correction. Therefore, the code retains its readability with barcode scanners. An alternative method of deliberately inserting false cells into the code and teaching the proprietary QR code decoder to look for these engineered defects would also reduce the allowed amount of other defects (from e.g. printing) that could be present in the code before it becomes unreadable. This is undesirable.

The invention has been described in detail with particular reference to certain preferred embodiments thereof, but it will be understood that variations and modifications can be effected within the scope of the invention.

PARTS LIST 10 item
12 barcode
14 copy-evident features
16 camera (image or capture device)
20 image sensor
22 imaging optics
24 microprocessor
26 memory
28 wireless interface
30 display
32 wireless data link
40 web-based data processing
100 barcode
102 finder patterns
110 area (pattern)
112 area (pattern)
120 QR code generated using default encoding of the code message as a single string of numerals
122 QR code generated using encoding of the code message as three separate strings of numerals

The invention claimed is:

1. A method for detecting reproduction of barcodes comprising:
providing a barcode which contains data;
providing a copy-evident background;
capturing an image of the barcode and the copy-evident background;
locating and decoding the barcode;
using the location of the barcode to locate the copy-evident background,
detecting copy introduced changes in the copy-evident background; and
authenticating the barcode if the copy-evident background has not been copied.

2. The method of claim 1 wherein the copy-evident background is located adjacent to the barcode.

3. The method of claim 1 wherein the copy-evident background contains one or more color elements.

4. The method of claim 1 further wherein the copy-evident background is a void pantograph.

5. The method of claim 1 further wherein the barcode is authenticated on site by means of a computer or other computational device.

6. The method of claim 1 further comprising:
transmitting the data obtained from the barcode, an image of the barcode, or both to a remote location for authentication.

7. The method of claim 6 further comprising:
transmitting a confirmation of authentication from the remote location to the site of the transmission.

8. A method for detecting reproduction of barcodes comprising:
providing a barcode which contains data and one or more color elements;
capturing an image of the barcode and a copy-evident background;
locating and decoding the barcode;
using the location of the barcode to locate the copy-evident background,
detecting copy introduced changes in the color of the barcode; and
authenticating the barcode if the barcode has not been copied.

* * * * *